United States Patent Office 3,146,170
Patented Aug. 25, 1964

3,146,170
MANUFACTURE OF COSMETIC PREPARATIONS CONTAINING CELLULOSE CRYSTALLITE AGGREGATES
Orlando A. Battista, Drexel Hill, Pa., assignor, by mesne assignments, to FMC Corporation, San Jose, Calif., a corporation of Delaware
No Drawing. Filed Apr. 10, 1962, Ser. No. 186,349
9 Claims. (Cl. 167—85)

This invention relates to improved cosmetic preparations having cellulose crystallite aggregates or certain derivatives of cellulose crystallite aggregates present therein. The preparations, aside from the presence of the crystallite aggregates or aggregates derivatives, generally comprise those in current use, for which the aggregates and aggregates derivatives provide many useful advantages, depending on the cosmetic preparation.

By virtue of their unique properties, the crystallite aggregates and their derivatives are capable of improving a wide range of cosmetic products. In particular, the aggregates and their derivatives possess the highly useful property of forming stable homogeneous colloidal gels and dispersions which when mixed with cosmetic ingredients, form stable gels and dispersions without requiring the presence of an emulsifying agent, and these gels and dispersions, which may be generically classed as suspensions, may themselves comprise, or are readily adapted to produce, cosmetic creams, lotions, emulsions, dispersions, pastes, cakes, sticks and the like. The aggregates and their derivatives have a substantial affinity or sorptive power for oily, fatty and waxy materials, and also for water and other aqueous fluids, and on these accounts are of value in binding and stabilizing these and other ingredients of a preparation. In many cases, free-flowing apparently dry granular mixtures may be formed by mixing the aggregates or their derivatives with an oleaginous or aqueous material; the resulting mixtures may be useful per se, or may simplify the formulation process as by serving to introduce to the formulation such agents as flavors, odors, and the like, which are usually employed in low concentrations. The aggregates and their derivatives are compressible, and this property is imparted to mixtures containing them with the result that cosmetic forms like cakes and sticks are conveniently prepared. Coatings deposited from aggregates-containing cosmetics are easily washable from the skin or other surface by water.

The crystallite aggregates are available in a high state of purity, comprising as they do, one of the purest forms of cellulose, and are not likely to cause undesirable dermatological reactions. They have a smooth texture, being obtainable in the form of impalpable powders, and are substantially opaque. They are further characterized by having a variable particle size ranging from below 1 micron to 250 to 300 microns. They are obtainable in batches of varying particle size, or of very uniform particle size; in other words, the particle size is controllable.

Cellulose crystallite aggregates are small disintegrated aggregates of level-off D.P. cellulose. These small disintegrated aggregates, their properties and a method of disintegrating the level-off D.P. cellulose are described in United States Patent 2,978,446, issued April 4, 1961. They are acid-insoluble products produced by the controlled acid hydrolysis of cellulose and the level-off D.P. value reflects a destruction of the original fibrous structure of the cellulosic source material. The term "level-off D.P." has reference to the average level-off degree of polymerization of the cellulose product measured in accordance with the paper by O. A. Battista entitled "Hydrolysis and Crystallization of Cellulose," vol. 42, Industrial and Engineering Chemistry, pages 502–7 (1950).

The source material for the cellulose crystallite aggregates may be any of the neutral cellulose materials, such as natural fibers, for example, ramie, cotton, purified cotton, purified wood pulps such as bleached sulfite pulp, bleached sulfate pulp, etc., or regenerated forms of cellulose, for example, rayon, cellophane, etc., and in all instances has an actual D.P. greater than its average level-off D.P. The aggregates may have an average level-off D.P. value in the range of from about 15 to about 375 and the specific value will be dependent upon the source material. Aggregates having an average level-off D.P. in the range of 15 to 60, for example, are produced from regenerated forms of cellulose. Aggregates having an average level-off D.P. in the range of 60 to 125 may be obtained from alkali swollen natural forms of cellulose such as cotton linters and purified wood pulps. Sulfite pulp as a source material will produce cellulose crystallite aggregates having an average level-off D.P. in the range of 200 to 300. Although the cellulose chains in the crystallites are uniform in length by comparison with the source material, some variation occurs, and, for this reason, the D.P. is referred to as an average level-off D.P. value.

In accordance with recognized principles of polymer chemistry, in speaking of degree of polymerization (D.P.), reference is made to the pure polymer. It is to be understood that the stated level-off D.P. values of the cellulose has reference to substantially pure cellulose such as cellulose crystallites derived from highly purified cellulose sources including regenerated forms of cellulose. Where a crude or raw wood pulp is subjected to a hydrolysis treatment for the production of the level-off D.P. cellulose crystallites, appreciable amounts of lignin and other non-cellulose materials will be present in the residue and measurements of average level-off D.P. of such residue may exhibit apparent values as high as 500. Such high values reflect the presence of lignin and other non-cellulose material and are not true values of the level-off D.P. of the cellulose per se. However, there is present in the mass some cellulose which has been reduced to the average level-off D.P.

Associated with the level-off D.P. properties of the crystallite aggregates is the known fact that their chemical purity is very high and these aggregates constitute perhaps the purest form of cellulose. For example, the ash content ranges from about 10 to 600 p.p.m. whereas conventional fibrous cellulose will have an ash content of from 1000 to 4000 p.p.m.

It is well known that the various forms of cellulose, such as cotton and wood pulps, contain non-cellulosic components including plant steroids which steroids are believed to be chemically bound to the cellulose and thus are in a physiologically inert state. For example, purified wood pulps commonly termed high alpha pulps contain from about 1000 p.p.m. to about 3000 p.p.m. ether extractable components including plant steroids which cannot be assimilated by the human system. Acid hydrolysis in disrupting the fine structure of the cellulose may make the plant steroids more available for physiological assimilation. Cellulose crystallite aggregates, for example, formed from a refined wood pulp (93% alpha cellulose, 1000 p.p.m. ether extractable components) will contain about 800 p.p.m. of the ether extractable components. For certain preferred purposes of the present invention, the ether extractable component content (including the steroids) may be from about 50 p.p.m. and should not exceed about 500 p.p.m., preferably not exceeding about 200 p.p.m. Cellulose crystallite aggregates formed from high alpha cellulose and, for example, containing 800 p.p.m. of ether extractable components may be subjected to hot isopropanol extractions to reduce the extractable component content to less than 200 p.p.m. Special pulps of a dissolving type are commercially available containing less than 500 p.p.m. of ether extractable components including plant steroids and obviously the cellulose crystallite aggregates formed from such cellulose sources will have the desired low ether extractable component content.

In the production of the cellulose crystallite aggregates, they are washed with water after hydrolysis of the source material and the particle size of the individual aggregates will vary from about one micron to about 300 microns as determined by visual microscopic examination. These aggregates may be disintegrated to form products having a particle size less than one micron to about 300 microns and the particle size and the particle size distribution may be varied depending upon the specific disintegrating method and the period during which the aggregates are subjected to disintegration.

The preferred disintegration method is to attrite the aggregates, that is, subject the aggregates to a rubbing or shearing action, by means of a high speed cutting action in the presence of an aqueous medium. It is preferred that the water content of the mixture undergoing attrition should be at least about 15% to 25% by weight. The aggregates content of the mixture to be attrited is at least 3% by weight and, desirably, is higher as the efficiency of the cutting action increases with the aggregates content. For example, attrition at a 3% consistency so as to provide at least 1% of a particle size less than one micron will produce a milky dispersion. The relative viscosity or thickness of the dispersion varies with the relative proportion of particles of a size less than one micron. Prolonging attrition will increase the amount of fine particles and, accordingly, increase the viscosity to some extent. The stability of the dispersions increases with an increase in the pH of the medium. At pH's between substantially neutral and 11, the dispersions remain stable indefinitely.

Either before or after mechanical disintegration, the aggregates may be dried. For some purposes, it is preferable to de-water rather than dry the material because the never-dried cellulose crystallite aggregates form dispersions more readily and the dispersions have a smoother texture when prepared from a never-dried material. The aggregates may be dried and recovered in particulate form, for example, by freeze drying, spray drying, drum drying, vacuum drying and drying by solvent displacement.

A particularly unique and distinguishing characteristic of the disintegrated aggregates is that a stable dispersion of the aggregates in an aqueous medium, where the aggregates constitute about 1% by weight of the dispersion and at least 1% of the weight of the dispersed aggregates have a particle size of up to one micron, when applied to glass and the water allowed to evaporate forms an extremely adherent film on the glass.

Derivatives of cellulose crystallite aggregates, herein designated as aggregates derivatives, are essentially topochemical derivatives of the cellulose crystallite aggregates and possess physical characteristics and properties similar to those of cellulose crystallite aggregates. For example, the derivatives have about the same D.P., a size in the same particle size range as the crystallite aggregates from which they have been formed and similar dispersibility and gel forming characteristics. Chemically, the degree of substitution (D.S.) is at least 0.01 but in all cases is sufficiently low so that the derivatives are water-insoluble and/or organic solvent-insoluble. The unique and distinguishing characteristic of the disintegrated derivatives like that of the disintegrated crystallite aggregates is their ability to form stable dispersions in liquid media where the derivatives constitute at least about 1% by weight of the dispersion and at least 1% of the weight of the dispersed aggregates derivatives have a particle size not exceeding about one micron.

Oxidation derivatives containing one or more carbonyl linkages including aldehyde, carboxyl and mixed aldehydecarboxyl derivatives of the cellulose crystallite aggregates as disclosed in the copending application Serial No. 2133, filed January 13, 1960, now Patent No. 3,111,513, dated November 19, 1963, and having the characteristics as described are satisfactory for the purposes of this invention. Similarly, ether derivatives as described in copending application Serial No. 21034, filed January 13, 1960, are also satisfactory. These derivatives are characterized by having one or more —OR groups where R may be an aliphatic or substituted aliphatic radical, either a straight or branched chain containing from 1 to 12 or more carbon atoms, an aryl or aralkyl or substituted aralkyl radical or a carboxyalkyl, hydroxyalkyl, cyanoalkyl, alkoxyalkyl, aralkyloxyalkyl, or a dialkylaminoalkyl radical. Ester derivatives as described in copending application Serial No. 2135, filed January 13, 1960, are also satisfactory and include esters of inorganic acids such as the nitrates, nitrites, thiocyanates and phosphates and esters of organic acids such as the formates, acetates, propionates, butyrates, mixed acetate-propionates, mixed acetate-butyrates, other aliphatic acid derivatives containing up to 18 or more carbon atoms and aryl or aralkyl esters such as, for example, benzoates, phenyl acetate esters, phthalate esters, naphthonates and the like.

For the purposes of the present invention, the cellulose crystallite aggregates and the aggregates derivatives having physical characteristics and properties similar to those of the cellulose crystallite aggregates or equivalents and in the succeeding discussion and in the claims, the terms "cellulose crystallite aggregates" and "aggregates" are to be understood as designating and are used to designate both the cellulose crystallite aggregates and the aggregates derivatives.

For the purposes of the invention, a dispersion may be defined as having about 1 to 8% by weight of the aggregate dispersed in the aqueous or other liquid, the latter constituting the continuous phase of the mixture. The dispersion has the physical form or appearance of a liquid, and is flowable like a liquid. A gel may be defined as having about 3 to 35% by weight of aggregates dispersed in the aqueous or other liquid. The gel has the physical form of a jelly, paste, plastic mass or the like. Both dispersions and gels are included by the term suspension.

In general, and as has been indicated, the aggregates are preferably attrited before being used to make up a cosmetic preparation. In some instances, as in the manufacture of face powders, the aggregates need not necessarily be attrited, particularly if they have been dried as by spray drying, although in general, attrited aggregates are preferred. It will be apparent that in the case of water-containing cosmetic preparations, the aggregates may be initially in the form of wet gels which may serve to provide the water content of the preparation as well as to aid in obtaining a well-mixed product. For dry preparations, the aggregates may be employed in dry form, and the same is true where they are to be used in non-aqueous oleaginous preparations. For the latter, the aggregates are advantageously premixed with the oily, fatty, and/or waxy material to form an apparently dry, free flowing crumb, thus facilitating the formulation of the product.

A variety of cosmetic preparations may be benefitted by the addition of the aggregates, although as they are water- and oil-insoluble, their use is limited to preparations at least partly composed of solid materials. The term cosmetic is intended to embrace all types of products which are to be applied in any manner directly to the person for the purpose of cleansing or embellishment, including altering the appearance. Toilet soap and shaving soaps and creams are intended to be included in this definition as well as deodorants, depilatories and suntan and sunscreen preparations.

Considering the application of the aggregates the specific cosmetic products, they are useful in creams, which essentially comprise an oleaginous base, either as an addition thereto or to replace, at least in part, oily, fatty, and/ or waxy ingredients of the creams. For example, the aggregates may partly replace the almond oil, mineral oil, lanolin, beeswax, paraffin wax, oleic acid, or spermaceti, and the like which are conventionally used in creams, whether of the cleansing, emollient, or finishing types, and including cold cream, quick-liquefying cream, liquid cleanser cream, night cream, massage cream, vanishing cream, foundation cream, and various special creams. An advantage of replacing at least part of such materials is that the soiling tendency of the creams is reduced, that is to say, the creams after being spread over the skin by the user are less apt to pick up or attract soil or foreign particles; similarly, the deposited creams transfer off the user's skin less readily, as by contact with clothing, bed sheets, and the like. This last advantage is of particular importance in other creams such as deodorants, including deodorizer and anti-perspirant creams, which are used under the arms and on the palms and soles and which are quite apt to come in contact with clothing and to soil it to such an extent that the garments are frequently ruined. The glycerol content of finishing creams such as vanishing or foundation creams may be partly substituted by the aggregates to provide a resultant cream of increased opacity or whiteness, which many consider to be of better appearance than creams which tend to have a translucent or pearly luster. However, creams of the latter type may be made by holding down the aggregates content. The lanolin, petrolatum, ceresin, beeswax, cocoa butter, and/or stearic acid contents of emollient and vanishing creams, and also of cream and paste rouges, may be partly supplanted to reduce their soiling tendency, and more particularly to reduce their oily or greasy feel while yet retaining their power of free motion over the skin. Because they are lubricitous, and confer lubricity on a cream preparation without increasing its oleaginous character, the aggregates are suitable for addition to creams to be applied to the oily skin. Straight-forward addition of the aggregates to many creams is of value where a stiffening effect is sought.

Special creams such as protective creams may usefully incorporate the aggregates, as by addition, and the cream may be of any suitable type, such as a mixture of fats and oils, a jelly containing a physical barrier, an emulsion, or a soap base. These creams are of particlar value for protecting the hands from injury, or from soiling, in the carrying out of many processes and procedures in industrial plants. Those creams containing physical barriers are particularly adapted to receive the aggregates, which, being available in varying particle sizes, may form protective barriers on the skin of varying degrees of fineness and smoothness.

In cleansing lotions, which usually comprise more or less permanent suspensions of mucilaginous substances, conventional abrasives such as magnesium carbonate may be replaced in whole or part by the aggregates to reduce or eliminate the problem of settling. The magnesium carbonate, being insoluble and heavier than water, tends to settle out of the lotion on standing, an occurrence that detracts from the apperance of the preparation and which requires the user to shake the lotion well before each use. The use of the aggregates may not only provide an abrasive, but also, owing to their stable gel- and dispersion-forming properties, may lead to an indefinitely stable homogeneous lotion and may thus make unnecessary the need for conventional emulsifying agents like borax. It will be appreciated that the aggregates may at least partly replace the use of other metal salts and oxides which have a tendency to settle out of a lotion or suspension. Thickening of lotions, and also creams, may be readily achieved by simple addition of the aggregates and without relying on special agents like agar, pectin, and the like.

Make-up powders for the face may benefit from the presence of the aggregates. These powders usually comprise an opacifying agent (clay, titania, magnesia (zinc oxide, etc.), a slip material (talc, metal stearates, etc.), an adherent material (stearates, clay, etc.) and an absorbent (chalk, calcium carbonate, kaolin, etc.). The aggregates are capable of replacing, in while or in part, metal salts and oxides like chalk, kaolin, magnesium carbonate, talc, titania, magnesium stearate, zinc oxide, zinc stearate and the like. An advantage of such substitutions or replacement is the reduced incidence of undesirable dermatological reactions. For example, in the case of magnesium carbonate, a widely used ingredient, it is known that some persons are sensitive to the presence of trace amounts of elements like selenium, arsenic, or mercury which tend to be present in the magnesium carbonate owing to the difficulty of purifying it. The gravity of the the problem is underlined by the fact that amounts of selenium as low as one part per million may be detrimental. Other conventional ingredients, if not sufficiently fine, may give rise to mechanical irritation. In the case of ingredients like talc, by omitting it there is eliminated its characteristic earthy odor, which otherwise must be masked. Of further interest is the effectiveness of the aggregates for sorbing oil, this property being useful in face powders for combating oily skin, especially on the nose. By sorption is meant the capacity of the aggregates to absorb and/or adsorb oily, fatty, greasy, waxy and aqueous materials. Starch may be replaced in loose powders, and the resistance to caking of the powder may thus be improved in view of the fact that the aggregates per se are much more resistant to caking than starch. Starch becomes doughy even from perspiration.

In addition to the foregoing capabilities, the aggregates are of benefit to loose face powder compositions by virtue of their excellent adherence to surfaces including the skin, and on this account are useful in place of the adherent agents noted; by the degree to which their particle size may be varied; and by the extent to which their fluffiness or bulk density may be changed. The particle size for use in powders may be as low as 1 or 2 microns; although more usually it may be 30 microns which corresponds to a powder capable of passing through a 400 mesh screen. They are also available in particle sizes as high as 250 to 300 microns, and, furthermore, in uniformly-sized fractions or batches. The apparent or bulk density may be as low as 7 or 8 lbs. per cu. ft., which represents a very fluffy material, and as high as 34 lbs. per cu. ft. By comparison, conventional corn starch has a bulk density of 36.8 lbs. per cu. ft. By virtue of their fluffiness, and depending on the amount of aggregates incorporated in a preparation, the conventional step of aerating face powders before packaging may in some cases be omitted. In the lower particle sizes, say up to 30 or 50 microns, the aggregates comprise an impalpable, easily distributable or rubbable powder well suited to the compounding of even the most delicate cosmetic products. In addition to having the foregoing properties, the aggregates may be given a variable degree of opacity by suitable selection of particle size, as by blending fractions of different sizes; thus the covering power of a face powder may be varied. It will be apperent that by themselves the aggregates possess most if not all of the requisite properties of a face powder. By incorporating conventional amounts of a desired color and a desired perfume, a complete, esthetically suitable face powder may be made which will inherently have a mat effect, and which may be used per se or serve as a base, with or without the color and perfume, to which only minor additions need be made to obtain desired finished powders to suit different types of skin.

In compact powders, including face powder and rouge, which are pressed after the addition of a binder like gum arabic, gum tragacanth, glycerine, sorbitol, etc., the use of the aggregates may eliminate the need for the binder as the aggregates are inherently compressible in the dry or wet state to any desired degree. As with loose powders, the aggregates may serve as a base for making various types of compact powder and in this form may comprise the major portion of the finished product.

The aggregates are also useful in lipstick compositions and may replace one or more oleaginous ingredients in whole or part, such as the fats and waxes, with the advantage of decreased greasiness without loss of lubricity, and improved consistency retention. Fats and waxes commonly used in lipstick compositions include beeswax, carnauba wax, ceresin, lanolin, lard, mineral oil, petrolatum, etc. Conventionally used lipstick flavors, usually comprising a volatile, water-immiscible organic ester, may be better retained in the lipstick owing to the good sorptive capacity of the aggregates for such compounds. The aggregates form free-flowing, apparently dry mixes with flavors, and thus may facilitate lipstick manufacture by serving as a carrier for introducing these volatile compounds to the production batch and losses of the flavors may be reduced.

In mascara preparations such as mascara cake, the aggregates may supplant conventional soaps like triethanolamine stearate, triethanolamine, oleate, etc., and thereby render the preparation less irritating to the eyes; furthermore, the cake itself may be prepared more easily owing to the compressibility of the aggregates. The waxes frequently used in these preparations, and also in roll-on mascara and cream mascara, may be at least partly replaced, with advantages similar to those described in wax substitutions. On account of their fine particle size and good adherence, the aggregates are capable of imparting a cleaner effect to eyelashes, avoiding the thick, pasty, or crumbly look resulting from the use of some conventional preparations or the startling effect imparted by some enamel-like preparations. Use of the aggregates permits a wider selection of colors to be employed and thus may avoid dependence on the conventional but somewhat dangerous use of silver nitrate with sodium thiosulfate. Suitable colors may include natural pigments, including carbon, ochers, siennas, umbers, ultramarine, etc. In similar ways, the aggregates may be of value to other cosmetics for use around the eye, as in eye shadow sticks, eye liner pencils, and eyebrow pencils.

The aggregates may replace certain components in depilatories, particularly earthy fillers like talc and lime, or whiteners like barium sulfate, magnesia, and titania, with advantages similar to those described.

Particularly in the case of deodorant preparations like deodorizers and anti-perspirants, which frequently simply comprise an active deodorant ingredient and a cream base, the aggregates by themselves may constitute the base. For example, a deodorizer may be prepared by mixing one or more active agents like hexachlorophene, bithionol, salicylic acid, zinc peroxide, zinc phenolsulfonate, boric acid, benzoic acid, hydroxyquinoline sulfate, etc. with the aggregates in gel form, and the resulting mixture, having an appearance, feel, lubricity, spreading quality, and adherence similar to a cream preparation, may be used as the deodorizer, or in many cases as a basic mix requiring only minor additions to make a finished product. Such a mixture or product has the advantage of being lubricitious without greasiness. If used without modifications or additions, it would, after application, readily dry to form a fine-grained, adherent coating easily removable with water. The aggregates in this coating will not soil or otherwise affect a fabric or garment with which it may come into contact. Similarly, an anti-perspirant preparation may be prepared by mixing one or more conventional active agents like alum, aluminum chloride, zinc chloride, aluminum acetate, zinc sulfate, zinc phenolsulfonate, tannic acid and tannin, etc., with the aggregates in gel form. Both aqueous and non-aqueous aggregates gels are of value in the foregoing preparations.

The crystallite aggregates may improve shaving creams, soaps and sticks of the lathering type by strengthening and stabilizing the lather. It appears that the tiny particles of aggregates strengthen the gas-enclosing walls of the lather and prevent them from readily breaking down. The aggregates may replace, at least in part, the conventional talc whitener used in some powdered shaving soaps and in styptic pencils and thus may avoid or reduce the characteristic earthy odor of the talc. In powedered soaps the aggregates may also function to prevent caking.

In sunscreen products, the aggregates, being opaque, may substitute for conventional opaque ultraviolet ray-scattering agents like talc and titania, with advantages already described. In these preparations, as well as in many others, including suntan products and leg paints, the aggregates provide lubricity without greasiness, and in addition, the adherence of the product to the skin is enhanced, and its water-removability improved. As these preparations are frequently in dispersion form, a further advantage resides in the stability which may be imparted to the dispersions by the presence of the aggregates. Of interest in this connection are simple 2-, 3-, or 4-component sunscreen preparations made by mixing a base like petrolatum or zinc oxide or lanolin with an aggregates-containing gel having, say 3 to 25% by weight of aggregates and the balance water. A sunburn preventive may be added to help block out harmful radiation, including such agents as acetanilide, cholesterol, p-aminobenzoic and salicylic acid salts, quinine salts, tannins, and the like. These components may form compatible mixtures. Suntan make-up, whether in loose powder form for the face and other areas, or in cake form, may be benefitted in the manner described for make-up powders.

In manicure compositions, water removable nail coating compositions may be prepared comprising simply the aggregates, a coloring agent, and water, and in which the aggregates, particularly of the lowest particle sizes, provide the necessary adherence to the nails. Such compositions are of value for application to the nails for a single occasion of short duration, after which the coatings are removable by simply washing the hands in water. Being safe, they may be used by children.

Facial masks may be improved in respect of their adherence and water-removability by the addition of the aggregates, which, furthermore, may replace such less desirable inorganic components like bentonite, fuller's earth, kaolin, infusorial earth, etc.

Bath additives or bubble baths, may be benefitted by the aggregates in respect of the stability of the resulting bubbles. As noted, the aggregates have stabilization properties for bubbles and lathers. They may replace conventional stabilizers like methyl cellulose which tends to form viscous gummy solutions. In fragrant bath powders or dusting powders, the aggregates may substitute for conventional talc, and colloidal clay, as absorbents, and may replace titania as a whitener. They are further able to replace adherence-improvers like magnesium or zinc stearates. In other fragrance preparations, the aggregates may be mixed with a perfume to provide an apparently dry, solid, free-flowing, fragrance mixture, or sachet, suitable for sprinkling per se in linen closets, clothing drawers, and the like, or for use in sachet bags. The aggregates retain the perfume so that the fragrance is slowly given up over a period of time. Similarly, other solid forms like sticks, compressed cakes and the like may be prepared.

The cellulose crystallite aggregates are also utilized advantageously in detergent compositions. These compositions comprise cellulose crystallite aggregates and an active detergent substance such as the usual soaps (alkali-metal salts of higher fatty acids) and the wide range of synthetic surface-active agents which have replaced soaps for various purposes. The detergent substance is present in the composition in an amount sufficient to impart its detergent characteristic to the composition. For example, in certain toilet soaps, the aggregates may be used in lieu of all or part of the coconut oil, which, although widely used as a lathering agent, is considered to be harsh and irritating to the skin. In this substitution, the aggregates, which may be of 30 to 100 microns particle size, again impart lubricity without greasiness, and they improve the lather strength. They may also act as a whitener and as an abrasive in bar and powdered soap, and prevent the latter from caking.

Powdered, liquid and paste types of dentifrice preparations may be improved by the addition of the aggregates.

Not the least of the characteristics of the aggregates is their removability from the skin by the application of water, regardless of the preparation in which they are used. While they are not soluble in water, they are dispersible in it and are readily washed off the skin.

Any preparation in which settling or sedimentation may be a problem may be aided by addition of the aggregates, it having been found that their stable dispersion- and gel-forming characteristics are also applicable to more complex mixtures. Elimination of settling is particularly possible in preparations where gels of the aggregates may be used owing to the higher content of aggregates which gels may have.

As indicated, many of the cosmetic ingredients which the aggregates are capable of supplanting are toxic to some extent. Thus, magnesium oxide and magnesium carbonate exhibit a moderate local irritant effect, either acute or chronic, on the skin or mucous membranes; while calcium carbonate, paraffin wax, triethanolamine, oleic acid, castor oil and palm oil all exhibit a slight irritant effect. Caustic soda and caustic potash have a high irritant action. Almond oil, beeswax, lanolin, spermaceti, ceresin, carnauba wax, castor oil, starch, tragacanth gum, and palm oil have been recognized as having a slight allergenic effect. Talc, borax and caustic soda exert a moderate local toxic action when inhaled, while with calcium carbonate, triethanolamine and starch, the action is slight. When ingested, borax has a moderate toxic effect and calcium carbonate and triethanolamine have a slight effect. Caustic soda and caustic potash have a high toxic action when ingested.

On the other hand, the crystallite aggregates are safe enough to be eaten and have no known toxic local effects. They have a bland taste and odor, a white color, and physically resemble starch.

With the exceptions noted, the methods of formulating the cosmetic preparations may, in general, be those employed for conventional cosmetics or other similar commercial products. A convenient and effective method, in some cases, is to start with the aggregates in gel or dispersion form and to blend the other ingredients therein; if a dry powder is desired, the resulting blend may be subjected to spray drying.

The invention may be illustrated by the following examples.

The cellulose crystallite aggregates used in the succeeding examples were prepared by hydrolyzing Ketchikan sulfite wood pulp with a 0.5% by weight aqueous solution of HCl for 1 hour at 250° F., there being obtained a material having an average level-off D.P. of 220 and a purity above 96%. This material was dried in a vacuum oven at 158° F. to a moisture content of about 4 to 5% by weight. It was then screened, and the fraction passing through a 325-mesh sieve (44 microns and less) was taken.

*Example 1*

A conventional cleansing cream was prepared, sample C and also an identical cream, D, but containing crystallite aggregates, the compositions of which were as follows:

|  | C | D |
|---|---|---|
|  | G. | G. |
| Beeswax | 8.4 | 8.4 |
| Mineral oil | 25.0 | 25.0 |
| Borax | 0.4 | 0.4 |
| Water | 16.2 | 16.2 |
| Crystallite aggregates |  | 5.0 |

Both creams had substantially the same lustrous pearly white appearance, although upon standing, water separated from cream C. A small amount of liquid in the form of a milky dispersion also separated from cream D, the amount of which was considerably smaller than in the case of C. Both creams were easily movable over the skin. After removal from the skin by wiping the absorbent paper, cream D appeared to leave the skin with a smoother feel.

*Example 2*

A hand lotion was made up comprising:

| | G. |
|---|---|
| Crystallite aggregates | 15 |
| Glycerine | 73 |
| Distilled water | 10 |
| Oil of peppermint | 2 |
| Sodium lauryl sulfate | Trace |

The lotion was viscous but readily pourable and had a lustrous pearly white appearance. It rubber smoothly over the hand, giving the impression of lubricity without greasiness; on drying the applied coating, no visible trace of the aggregates was apparent.

*Example 3*

An anti-perspirant preparation was made up containing:

| | G. |
|---|---|
| Stearic acid | 16.0 |
| Crystallite aggregates | 5.0 |
| Sodium lauryl sulfate | 1.5 |
| Propylene glycol | 5.0 |
| Water | 49.0 |
| Urea | 5.0 |
| Aluminum sulfate | 18.0 |

In formulating, two mixtures were prepared, one containing the aggregates and the stearic acid, and the other comprising the balance of the ingredients. Each mixture was heated to 70° C. and then mixed. The resulting product was in the form of a soft white odorless paste that was easily spreadable over the skin and had a non-greasy feel. It could be wiped off the skin readily with absorbent paper. After application to the skin and drying, the coating had the form of a white adherent non-greasy layer that was easily removed by wiping.

*Example 4*

A shaving cream was prepared from the following:

| | |
|---|---|
| Crystallite aggregates | g-- 50 |
| Triethanolamine | g-- 10 |
| Oleic acid | g-- 20 |
| Sodium lauryl sulfate | mg-- 10 |
| Water, q.s. | |

The ingredients were all thoroughly mixed together in a Waring Blendor, producing a cream which was placed in a bottle and capped. It had a light, wet appearance resembling conventional lather type shaving cream and had a pleasant odor. The preparation had a slippery, creamy feel on the skin without being greasy and was readily washed away with water. It was suitable for use as a brushless shaving cream.

*Example 5*

A conventional calamine-containing cream-type sunscreen preparation was made, identified below as E, and at the same time another preparation, F, was prepared in which crystallite aggregates were substituted for the calamine.

|  | E | F |
|---|---|---|
|  | G. | G. |
| Calamine | 7.5 |  |
| Petrolatum | 18.7 | 18.7 |
| Lanolin | 6.2 | 6.2 |
| Water | 17.5 | 17.5 |
| Crystallite aggregates |  | 7.5 |

Upon being spread over smooth paper, cream F produced a coating that was noticeably less greasy than E. Also, cream F was white in color and less apt to leave a visible stain on clothing, whereas E was pink owing to the presence of the calamine.

*Example 6*

Two powdered dentifrices, G and H, were made up having the following compositions:

|  | G | H |
|---|---|---|
| Sodium metaphosphate | G. 38.9 | G. 38.9 |
| Calcium carbonate | 10.0 |  |
| Sodium lauryl sulfate | 0.5 | 0.5 |
| Flavor | 1.0 | 1.0 |
| Saccharin | 0.1 | 0.1 |
| Crystallite aggregates |  | 10.0 |

Sample G containing calcium carbonate as an abrasive was a conventional material, while in sample H the crystallite aggregates were used in lieu of the calcium carbonate. Both samples were thoroughly blended and then placed in stoppered bottles. After standing for several days, both were repeatedly sniffed, and it was apparent that the aggregates-containing sample exhibited a stronger odor of the flavor (peppermint), although as made up both samples originally contained the same amount of flavor. When rubbed with the finger, both preparations had an abrasive feel, sample H being less abrasive than G. In appearance, sample H had a softer look and appeared to have a somewhat fluffy character not exhibited by G, which was a white conventional-looking powder.

The substitution of water-insoluble and/or organic solvent-insoluble aggregates derivatives having the properties and characteristics described hereinbefore, such as, for example, carboxymethyl, hydroxypropyl or acetate derivatives, for the cellulose crystallite aggregates in the foregoing examples form preparations or compositions having substantially similar properties as those described in the specific examples. For example, creams and lotions prepared as described in the foregoing examples substituting mechanically disintegrated aggregates derivatives having a D.S. of not more than 0.1 to about 0.2 for the crystallite aggregates, are of approximately the same appearance but may have a slightly smoother feel when rubbed between the fingers. Thus, the same amounts of a sodium carboxymethyl or a hydroxypropyl derivative of the aggregates having a D.S. of 0.1 form creams and lotions with the same white lustrous appearance. Where the same derivatives have a D.S. of about 0.3, the creams and lotions have a more translucent appearance and where the D.S. is about 0.4, the ointment has an appearance approaching that of white petrolatum. These preparations retain the lubricity and non-greasy characteristics as described in the foregoing example.

As indicated, the aggregates and derivatives are suitable for use in cosmetic preparations which contain an ingredient in the solid state; that is to say, a solid ingredient other than the aggregates. Where their presence is not harmful, they may be of benefit to non-solid-containing liquid preparations such as lotions, emulsions, solutions, liquid creams, or other liquid mixtures. While the aggregates and derivatives are normally in a solid state, whether dry or suspended in a liquid such as water, they are capable of existing in a form where some question may arise as to whether or not they are in the solid state; this is a form which is brought about when aggregate particles of extremely fine size, say less than 1 micron and particularly less than 0.5 micron, are dispersed in water; under these conditions, the aggregates form what are called gel particles, comprising particles so highly swollen that a question may arise as to whether they are in a solid or a liquid state. For the purposes of this invention, it is to be understood that the terms "aggregates," or "solid aggregates," or "solid particles," or "solid form," or "finely divided solid form" are intended to include these gel particles of aggregates and derivatives as well as the aggregates of larger size.

It is apparent from the foregoing description that the present invention provides improved cosmetic compositions including cellulose crystallite aggregates and at least one active cosmetic substance or ingredient in a sufficient amount and in an available form so as to impart its characteristic cosmetic effect or property to the composition.

This application is a continuation-in-part of application Serial No. 65,302, filed October 27, 1960, now abandoned.

Although the invention has been described in connection with specific embodiments of the same, it will be understood that it is capable of obvious variations without departing from its scope.

I claim:

1. A cosmetic composition comprising a substance selected from the group consisting of cellulose crystallite aggregates, water-insoluble derivatives of cellulose crystallite aggregates having a D.S. of at least 0.01 and organic solvent-insoluble derivatives of cellulose crystallite aggregates having a D.S. of at least 0.01, the cellulose crystallite aggregates having an average level-off D.P., the substance containing not more than about 500 p.p.m. of ether-extractable components, and at least one active cosmetic ingredient compatible with the substance and present in the composition in an available form and in an amount sufficient so as to impart its characteristic cosmetic effect when the composition is applied topically.

2. A cosmetic composition as defined in claim 1 wherein the cellulose crystallite aggregates have an average level-off D.P. of from 15 to 375 and at least 1% of the substance, by weight, has a particle size not exceeding 1 micron.

3. A cosmetic composition as defined in claim 1 wherein the substance is cellulose crystallite aggregates and at least 1%, by weight, have a particle size not exceeding 1 micron.

4. A cosmetic composition as defined in claim 2 wherein the composition is in a substantially dry powder form.

5. A cosmetic composition as defined in claim 2 wherein the composition is in a substantially dry solid compressed form.

6. A cosmetic composition as defined in claim 2 wherein the composition includes water and is in a gel form, the substance being colloidally dispersed in the water, the gel comprising from 3% to 35%, by weight, of the substance.

7. A cosmetic composition as defined in claim 2 wherein the composition includes water and is in a pourable liquid form, the substance being colloidally dispersed in the water.

8. A cosmetic composition as defined in claim 2 wherein the composition includes an oleaginous material.

9. A cosmetic composition as defined in claim 2 wherein the active cosmetic ingredient is a detergent substance.

References Cited in the file of this patent

UNITED STATES PATENTS

| 2,978,446 | Battista et al. | Apr. 4, 1961 |
| 3,012,914 | Battista et al. | Dec. 12, 1961 |
| 3,023,104 | Battista | Feb. 27, 1962 |
| 3,052,593 | Battista | Sept. 4, 1962 |
| 3,067,037 | Herald et al. | Dec. 4, 1962 |

UNITED STATES PATENT OFFICE
CERTIFICATE OF CORRECTION

Patent No. 3,146,170                                     August 25, 1964

Orlando A. Battista

It is hereby certified that error appears in the above numbered patent requiring correction and that the said Letters Patent should read as corrected below.

Column 2, line 1, for "neutral" read -- natural --; column 4, line 5, for "21034" read -- 2134 --; column 5, line 71, for "magnesia (zinc" read -- magnesia, zinc --; column 5, line 75, for "while" read -- whole --; column 10, line 17, for "rubber" read -- rubbed --.

Signed and sealed this 8th day of December 1964.

(SEAL)
Attest:

ERNEST W. SWIDER                                  EDWARD J. BRENNER
Attesting Officer                                     Commissioner of Patents